United States Patent
Nishinaka et al.

(10) Patent No.: US 7,931,948 B2
(45) Date of Patent: Apr. 26, 2011

(54) PLASMA DISPLAY PANEL

(75) Inventors: Masaki Nishinaka, Osaka (JP); Akinobu Miyazaki, Osaka (JP); Seiji Nishitani, Kyoto (JP)

(73) Assignee: Panasonic Corporation, Osaka (JP)

( * ) Notice: Subject to any disclaimer, the term of this patent is extended or adjusted under 35 U.S.C. 154(b) by 730 days.

(21) Appl. No.: 11/664,978

(22) PCT Filed: Sep. 29, 2006

(86) PCT No.: PCT/JP2006/319465
§ 371 (c)(1),
(2), (4) Date: Apr. 9, 2007

(87) PCT Pub. No.: WO2007/040178
PCT Pub. Date: Apr. 12, 2007

(65) Prior Publication Data
US 2009/0009429 A1    Jan. 8, 2009

(30) Foreign Application Priority Data
Oct. 3, 2005  (JP) .................................. 2005-289789

(51) Int. Cl.
E06B 3/66 (2006.01)

(52) U.S. Cl. ........................... 428/34; 428/699; 428/426

(58) Field of Classification Search .................. 501/17, 501/15, 49; 428/426, 699, 34
See application file for complete search history.

(56) References Cited

U.S. PATENT DOCUMENTS

| | | | |
|---|---|---|---|
| 5,733,828 A * | 3/1998 | Usui et al. ........................ | 501/17 |
| 6,163,106 A | 12/2000 | Sugawara et al. | |
| 6,306,783 B1 | 10/2001 | Yamanaka | |
| 7,407,902 B2 | 8/2008 | Hasegawa et al. | |
| 2003/0228471 A1 | 12/2003 | Hayakawa et al. | |

FOREIGN PATENT DOCUMENTS

| | | |
|---|---|---|
| CN | 1656033 A | 8/2005 |
| EP | 1 496 025 A1 | 1/2005 |
| JP | 9-50769 | 2/1997 |
| JP | 09-278483 * | 10/1997 |
| JP | 11-79784 | 3/1999 |
| JP | 11-292564 | 10/1999 |
| JP | 2000-007375 | 1/2000 |
| JP | 2001-45877 | 2/2001 |
| JP | 2002-53342 | 2/2002 |
| JP | 2003-95697 | 4/2003 |
| JP | 2003-128430 | 5/2003 |
| JP | 2003-128430 A | 5/2003 |

(Continued)

OTHER PUBLICATIONS

JP 2003128434 English machine translation, obtained Jan. 1, 2010.*

(Continued)

*Primary Examiner* — Timothy M Speer
*Assistant Examiner* — Lauren Robinson
(74) *Attorney, Agent, or Firm* — McDermott Will & Emery LLP

(57) ABSTRACT

A plasma display panel has front plate (2) and back plate (10) that are faced to each other. The front plate has a display electrode, a dielectric layer, and a protective layer on a front glass substrate, and the back plate has an address electrode, a barrier rib, and a phosphor layer on a back glass substrate. The periphery of the front and back plates is sealed with sealing material (50) to form discharge space. Sealing material (50) contains, as a glass component, bismuth oxide and at least one of molybdenum oxide and tungsten oxide.

5 Claims, 2 Drawing Sheets

FOREIGN PATENT DOCUMENTS

| | | | |
|---|---|---|---|
| JP | 2003-128434 | | 5/2003 |
| JP | 2003128434 | * | 5/2003 |
| JP | 2004-35316 | | 2/2004 |
| JP | 2004-182584 | | 7/2004 |
| JP | 2004-284934 | | 10/2004 |

OTHER PUBLICATIONS

Yamanaka JP09-278483 English machine translation (http://www.ipdl.inpit.go.jp/homepg_e.ipdl) obtained May 13, 2010.*

Chinese Office Action issued in Chinese Patent Application No. CN 2006800013518 dated Feb. 6, 2009.

Korean Office Action issued in Korean Patent Application No. KR 10-2007-7009057 dated Sep. 29, 2008.

Korean Office Action issued in Korean Patent Application No. KR 10-2007-7009057 dated Mar. 24, 2008.

European Search Report issued in European Patent Application No. EP 06810863.8 dated Jun. 9, 2010.

* cited by examiner

PLASMA DISPLAY PANEL

RELATED APPLICATIONS

This application is the U.S. National Phase under 35 U.S.C. §371 of International Application No. PCT/JP2006/319465, filed on Sep. 29, 2006, which in turn claims the benefit of Japanese Application No. 2005-289789, filed on Oct. 3, 2005, the disclosures of which Applications are incorporated by reference herein.

TECHNICAL FIELD

The present invention relates to a plasma display panel used in a display device.

BACKGROUND ART

Plasma display panels (hereinafter referred to as "PDPs") allow definition and screen size to be increased, so that 65-inch class televisions (TVs) have been commercialized.

A PDP is basically formed of a front plate and a back plate. The front plate has the following elements:
- a glass substrate made of sodium borosilicate glass using a float method;
- a display electrode that is formed on a main face of the glass substrate and includes a stripe-like transparent electrode and a bus electrode;
- a dielectric layer that covers the display electrode and serves as a capacitor; and
- a protective layer that is formed on the dielectric layer and is made of magnesium oxide (MgO).

While, the back plate has the following elements:
- a glass substrate;
- a stripe-like address electrode formed on a main face of the glass substrate;
- a base dielectric layer for covering the address electrode;
- barrier ribs formed on the base dielectric layer; and
- phosphor layers that are formed between the barrier ribs and emit red light, green light, and blue light, respectively.

The front plate and back plate are stuck to each other while the sides having an electrode are faced to each other, and the periphery of them is air-tightly sealed with a sealing material. Discharge space partitioned by the barrier ribs is filled with discharge gas of Ne—Xe at a pressure of 400 to 600 Torr. In the PDP, a video signal voltage is selectively applied to the display electrode to cause discharge, ultraviolet rays that are generated by the discharge excite respective phosphor layers to emit red light, green light, and blue light, and thus a color image is displayed.

As the dielectric layers, low-melting glass mainly made of lead oxide is used. As the sealing material, also, low-melting glass mainly made of lead oxide is used. In consideration of recent environmental issues, examples of dielectric layers containing no lead component are disclosed in Japanese Patent Unexamined Publication No. 2003-128430, Japanese Patent Unexamined Publication No. 2002-053342, Japanese Patent Unexamined Publication 2001-045877, and Japanese Patent Unexamined Publication No. H9-050769.

An example of phosphoric-acid-based sealing material containing no lead component and an example of bismuth-oxide-based sealing material are disclosed in Japanese Patent Unexamined Publication No. 2004-182584 and Japanese Patent Unexamined Publication No. 2003-095697.

Recently, PDPs have been increasingly applied to high definition TVs where the number of scanning lines is two or more times that in a conventional National Television Standards Committee (NTSC) method, and PDPs containing no lead component have been demanded in consideration of recent environmental issues.

Sealing material mainly made of phosphoric-acid/tin-oxide based low-melting glass that contains no lead component has a water resistance lower than that of lead-oxide-based sealing material, so that the air-tightness of the PDPs cannot be kept sufficiently, disadvantageously.

When the conventional sealing material made of bismuth-oxide-based glass is used, bismuth oxide reacts with silver materials in the display electrode on the front plate and the address electrode on the back plate to generate many air bubbles, and hence the air-tightness of the PDPs cannot be kept sufficiently, disadvantageously. Especially, in high-definition PDPs of the high-definition TVs or the like where the number of scanning lines is two or more times that in the conventional art, the number of electrodes is increased and hence the disadvantage becomes remarkable.

SUMMARY OF THE INVENTION

A PDP of the present invention has a front plate and a back plate that are faced to each other. The front plate has a display electrode, a dielectric layer, and a protective layer on a glass substrate, and the back plate has an address electrode, a barrier rib, and a phosphor layer on a substrate. The periphery of the front and back plates is sealed with sealing material to form discharge space. The sealing material contains, as a glass component, at least bismuth oxide and at least one of molybdenum oxide and tungsten oxide.

Thanks to such a structure, even sealing material containing no lead component can secure the air-tight sealing between the front plate and back plate, and can achieve a reliable and environmentally sensitive PDP.

REFERENCE MARKS IN THE DRAWINGS

Figure 1:
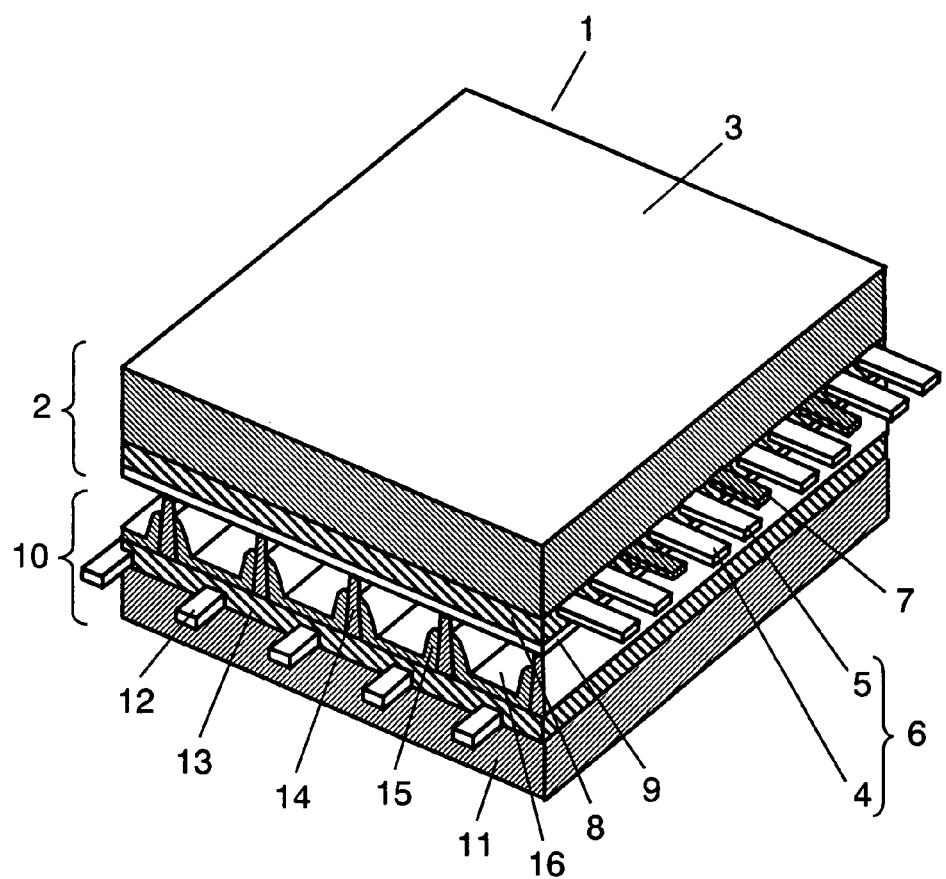
FIG. 1 is a perspective view showing a structure of a PDP in accordance with an exemplary embodiment of the present invention.

1 PDP
2 front plate
3 front glass substrate
4 scan electrode
4a, 5a transparent electrodes
4b, 5b metal bus electrodes
5 sustain electrode
6 display electrode
7 black stripe (shielding layer)
8 dielectric layer
9 protective layer
10 back plate
11 back glass substrate
12 address electrode 13 base dielectric layer
14 barrier rib
15 phosphor layer
16 discharge space
50 sealing material
51 exhaust pipe
52 frit tablet
81 first dielectric layer
82 second dielectric layer

DETAILED DESCRIPTION OF PREFERRED EMBODIMENTS

A PDP in accordance with an exemplary embodiment of the present invention will be described hereinafter with reference to the accompanying drawings.

Exemplary Embodiment

FIG. 1 is a perspective view showing a structure of a PDP in accordance with an exemplary embodiment of the present invention. The basic structure is similar to that of a general alternating-current surface discharge PDP. In PDP 1, front plate 2 formed of front glass substrate 3 or the like is faced to back plate 10 formed of back glass substrate 11 or the like as shown in FIG. 1. The periphery of PDP 1 is sealed air-tightly with sealing material (not shown) such as glass frit. Discharge space 16 in sealed PDP 1 is filled with discharge gas such as Ne and Xe at a pressure of 400 to 600 Torr.

On front glass substrate 3 of front plate 2, a plurality of rows each of which has a pair of band-like display electrodes 6 and black stripe (shielding layer) 7 are arranged in parallel. Here, the pair of band-like display electrodes 6 is formed of scan electrode 4 and sustain electrode 5. Dielectric layer 8 serving as a capacitor is formed on front glass substrate 3 so as to cover display electrodes 6 and shielding layers 7, and protective layer 9 made of magnesium oxide (MgO) is formed on the surface of dielectric layer 8.

On back glass substrate 11 of back plate 10, a plurality of band-like address electrodes 12 are arranged in parallel with each other orthogonally to scan electrodes 4 and sustain electrodes 5 of front plate 2, and are covered with base dielectric layer 13. Barrier ribs 14 with a predetermined height for partitioning discharge space 16 are formed on base dielectric layer 13 between address electrodes 12. Phosphor layers 15 for emitting red light, blue light, and green light with ultraviolet rays are sequentially applied to grooves between barrier ribs 14, correspondingly to address electrodes 12. Discharge cells are formed at positions where scan electrodes 4 and sustain electrodes 5 cross address electrodes 12. Discharge cells that are aligned in the display electrode 6 direction and have red, blue, and green phosphor layers 15 define pixels for color display.

Figure 2:
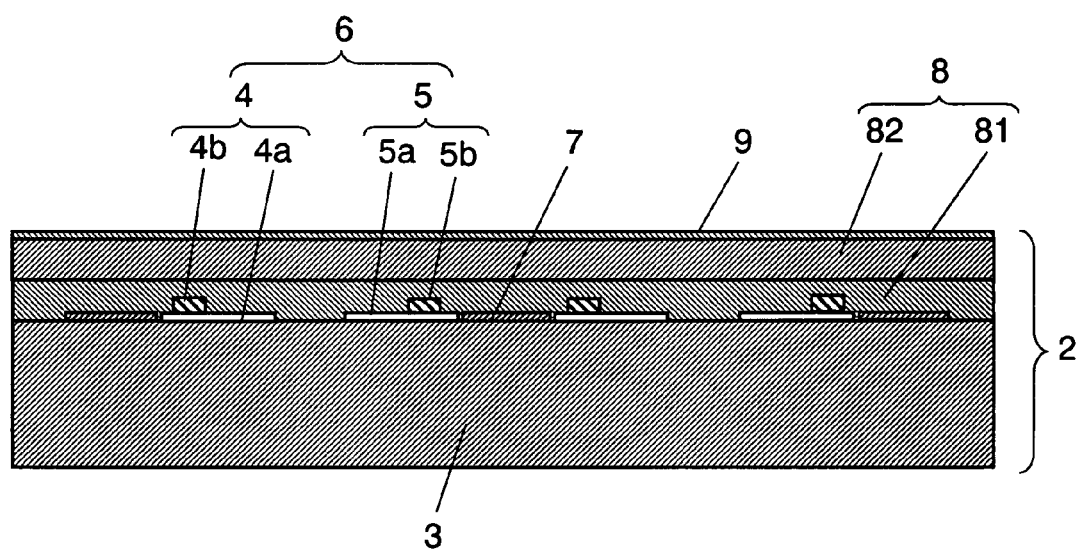
FIG. 2 is a sectional view showing a structure of a front plate of the PDP in accordance with the exemplary embodiment of the present invention.

FIG. 2 is a sectional view showing a structure of front plate 2 of the PDP in accordance with the exemplary embodiment of the present invention. In FIG. 2, the structure of FIG. 1 is vertically flipped. In FIG. 2, display electrodes 6 having scan electrode 4 and sustain electrode 5 and black stripes 7 are patterned on front glass substrate 3 manufactured by a float method. Scan electrode 4 and sustain electrode 5 are formed of transparent electrodes 4a and 5a made of indium tin oxide (ITO) or tin oxide ($SnO_2$) and metal bus electrodes 4b and 5b as metal electrodes formed on transparent electrodes 4a and 5a, respectively. Metal bus electrodes 4b and 5b are used for applying conductivity in the longitudinal direction of transparent electrodes 4a and 5a, and are made of conductive material mainly containing silver (Ag) material.

Dielectric layer 8 has a structure having at least two layers, namely first dielectric layer 81 and second dielectric layer 82. First dielectric layer 81 is formed on front glass substrate 3 so as to cover transparent electrodes 4a and 5a, metal bus electrodes 4b and 5b, and black stripes 7. Second dielectric layer 82 is formed on first dielectric layer 81. Protective layer 9 is formed on second dielectric layer 82.

Next, a manufacturing method of the PDP is described. First, scan electrodes 4, sustain electrodes 5, and shielding layers 7 are formed on front glass substrate 3. Transparent electrodes 4a and 5a and metal bus electrodes 4b and 5b are patterned using a photolithography method. Transparent electrodes 4a and 5a are formed using a thin film process or the like, and metal bus electrodes 4b and 5b are formed by firing paste containing silver (Ag) material at a predetermined temperature and solidifying it. Shielding layer 7 is similarly formed by screen-printing the paste containing black pigment or applying the black pigment on the whole surface of the glass substrate, then by patterning it using the photolithography method, and by firing it.

Next, a dielectric paste layer (dielectric material layer) is formed by applying dielectric paste onto front glass substrate 3 so as to cover scan electrodes 4, sustain electrodes 5, and shielding layers 7 by a die coating method or the like. The dielectric paste is applied, and then is left for a predetermined time. Thus, the surface of the applied dielectric paste is leveled to be flat. Then, the dielectric paste layer is fired and solidified, thereby forming dielectric layer 8 for covering scan electrodes 4, sustain electrodes 5, and shielding layers 7. The dielectric paste is paint containing dielectric glass such as glass powder, a binder, and a solvent. Protective layer 9 made of magnesium oxide (MgO) is then formed on dielectric layer 8 by a vacuum deposition method. In these steps, predetermined structures (scan electrodes 4, sustain electrodes 5, shielding layers 7, dielectric layer 8, and protective layer 9) are formed on front glass substrate 3, and front plate 2 is completed.

While, back plate 10 is formed as follows. First, a material layer defining a structure for address electrodes 12 is formed on back glass substrate 11 by a screen-printing method of paste containing silver (Ag) material or a method of forming a metal film on the whole surface and then patterning it in the photolithography method. Then, the material layer is fired at a predetermined temperature, thereby forming address electrodes 12 as metal electrodes. Next, a dielectric paste layer is formed by applying dielectric paste onto back glass substrate 11 having address electrodes 12 so as to cover address electrodes 12 by the die coating method or the like. Then, the dielectric paste layer is fired to form base dielectric layer 13. The dielectric paste is paint containing dielectric glass such as glass powder, a binder, and a solvent.

Paste for barrier ribs containing barrier rib material is applied onto base dielectric layer 13, and patterned in a predetermined shape, thereby forming a barrier rib material layer. Then, the material layer is fired to form barrier ribs 14. Here, the paste for the barrier ribs applied onto base dielectric layer 13 can be patterned using the photolithography method and a sand blast method. Next, phosphor paste containing phosphor material is applied onto base dielectric layer 13 between adjacent barrier ribs 14 and onto side faces of barrier ribs 14, and fired, thereby forming phosphor layer 15. In these steps, back plate 10 having predetermined components is completed on back glass substrate 11.

Figure 3A:
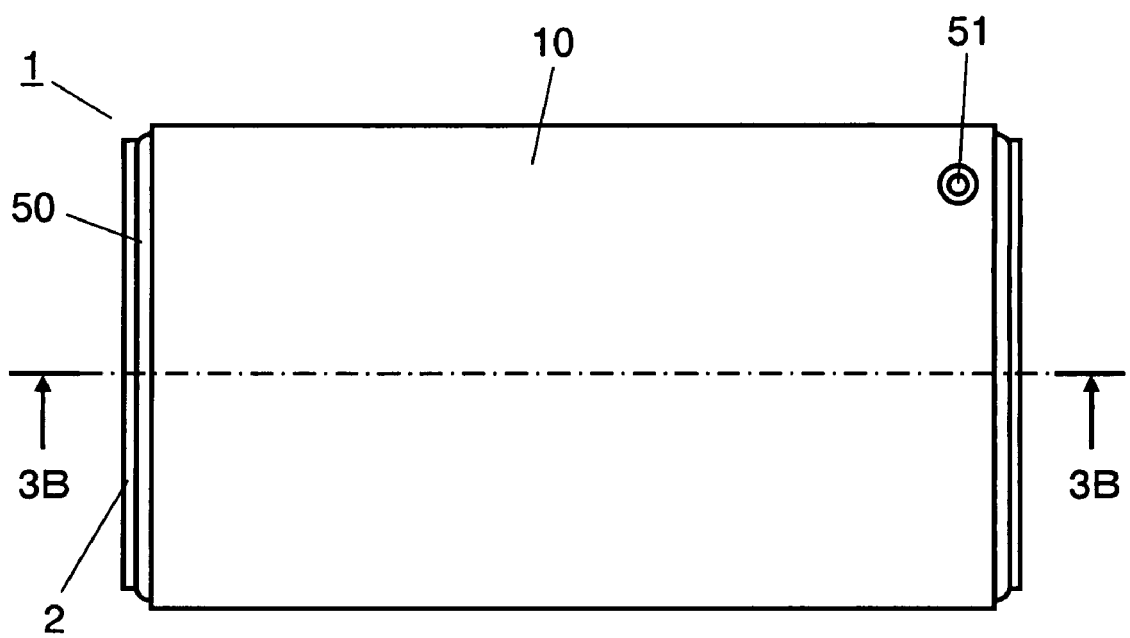
FIG. 3A is a plan view showing a sealed and joined state between the front plate and a back plate of the PDP in accordance with the exemplary embodiment of the present invention.
Figure 3B:
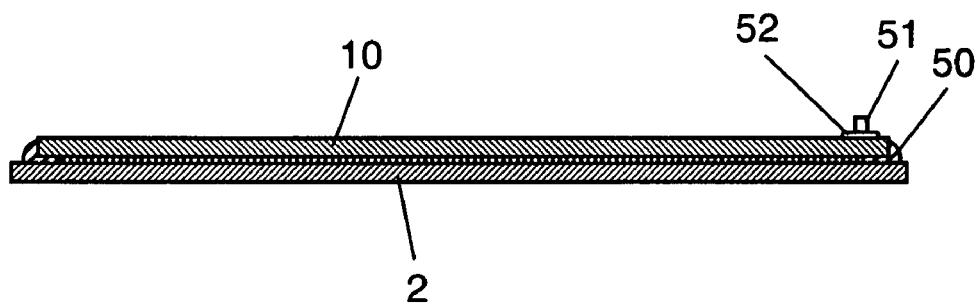
FIG. 3B is a sectional view taken along a line 3B-3B of FIG. 3A.

FIG. 3A and FIG. 3B are views showing a sealed and joined state between front plate 2 and back plate 10 of the PDP in accordance with the exemplary embodiment of the present invention. The periphery of front plate 2 and back plate 10 is sealed by sealing material 50, and back plate 10 has exhaust pipe 51. FIG. 3A is a plan view, and FIG. 3B is a sectional view taken along a line 3B-3B of FIG. 3A.

As shown in FIG. 2, FIG. 3A, and FIG. 3B, front plate 2 is faced to back plate 10 so that display electrodes 6 are orthogonal to address electrodes 12, and the periphery of them is sealed by sealing material 50. Discharge space 16 is evacuated by exhaust pipe 51, then discharge gas containing Ne and Xe is filled through exhaust pipe 51, and exhaust pipe 51 is sealed and cut, thereby completing PDP 1.

First dielectric layer 81 and second dielectric layer 82 constituting dielectric layer 8 of front plate 2 are described in detail. Dielectric material of first dielectric layer 81 has the following components:

20 to 40 wt % bismuth oxide ($Bi_2O_3$);
0.5 to 15 wt % calcium oxide (CaO); and
0.1 to 7 wt % at least one selected from molybdenum oxide ($MoO_3$), tungsten oxide ($WO_3$), cerium oxide ($CeO_2$), and manganese oxide ($MnO_2$).

The dielectric material further contains 0.5 to 12 wt % at least one selected from strontium oxide (SrO) and barium oxide (BaO).

Instead of molybdenum oxide ($MoO_3$), tungsten oxide ($WO_3$), cerium oxide ($CeO_2$), and manganese oxide ($MnO_2$), the dielectric material may contain 0.1 to 7 wt % at least one selected from copper oxide (CuO), chromium oxide ($Cr_2O_3$), cobalt oxide ($Co_2O_3$), vanadium oxide ($V_2O_7$), and antimony oxide ($Sb_2O_3$).

In addition to the above-mentioned components, the dielectric material may contain components containing no lead, for example, 0 to 40 wt % zinc oxide (ZnO), 0 to 35 wt % boron oxide ($B_2O_3$), 0 to 15 wt % silicon oxide ($SiO_2$), or 0 to 10 wt % aluminum oxide ($Al_2O_3$). The contents of these components are within the content ranges corresponding to the components of the conventional art, and are not especially limited.

The dielectric material having this composition is crushed by a wet jet mill or a ball mill so that average particle diameter is 0.5 μm to 2.5 μm, thereby producing dielectric material powder. Next, 55 to 70 wt % dielectric material powder and 30 to 45 wt % binder component are sufficiently kneaded by three rolls, thereby producing paste for first dielectric layer for die coating or printing. The binder component is ethylcellulose, terpineol containing 1 to 20 wt % acrylic resin, or butyl Carbitol acetate. As necessary, dioctyl phthalate, dibutyl phthalate, triphenyl phosphate, or tributyl phosphate may be added as a plasticizer into the paste, and glycerol mono-oleate, sorbitan sesquioleate, or alkyl allyl group phosphate may be added as a dispersant into the paste, thereby improving the printing property.

The paste for a first dielectric layer is then printed on front glass substrate 3 so as to cover display electrodes 6 by the die coating method or the screen printing method, and is dried. Then, the paste is fired at 575 to 590° C., slightly higher than the softening point of the dielectric material, thereby forming first dielectric layer 81.

Second dielectric layer 82 is described hereinafter. Dielectric material of second dielectric layer 82 has the following components:

11 to 40 wt % bismuth oxide ($Bi_2O_3$);
6.0 to 28 wt % barium oxide (BaO); and
0.1 to 7 wt % at least one selected from molybdenum oxide ($MoO_3$), tungsten oxide ($WO_3$), cerium oxide ($CeO_2$), and manganese oxide ($MnO_2$).

The dielectric material further contains 0.8 to 17 wt % at least one selected from calcium oxide (CaO) and strontium oxide (SrO).

Instead of molybdenum oxide ($MoO_3$), tungsten oxide ($WO_3$), cerium oxide ($CeO_2$), and manganese oxide ($MnO_2$), the dielectric material may contain 0.1 to 7 wt % at least one selected from copper oxide (CuO), chromium oxide ($Cr_2O_3$), cobalt oxide ($Co_2O_3$), vanadium oxide ($V_2O_7$), and antimony oxide ($Sb_2O_3$).

In addition to the above-mentioned components, the dielectric material may contain components containing no lead, for example, 0 to 40 wt % zinc oxide (ZnO), 0 to 35 wt % boron oxide ($B_2O_3$), 0 to 15 wt % silicon oxide ($SiO_2$), or 0 to 10 wt % aluminum oxide ($Al_2O_3$). The contents of these components are within the content ranges corresponding to the components of the conventional art, and are not especially limited.

The dielectric material having this composition is crushed by a wet jet mill or a ball mill so that average particle diameter is 0.5 μm to 2.5 μm, thereby producing dielectric material powder. Next, 55 to 70 wt % dielectric material powder and 30 to 45 wt % binder component are sufficiently kneaded by three rolls, thereby producing paste for a second dielectric layer for die coating or printing. The binder component is ethylcellulose, terpineol containing 1 to 20 wt % acrylic resin, or butyl Carbitol acetate. As necessary, dioctyl phthalate, dibutyl phthalate, triphenyl phosphate, or tributyl phosphate may be added as a plasticizer into the paste, and glycerol mono-oleate, sorbitan sesquioleate, or alkyl allyl group phosphate may be added as a dispersant into the paste, thereby improving the printing property.

The paste for a second dielectric layer is then printed on first dielectric layer 81 by the screen printing method or the die coating method, and is dried. Then, the paste is fired at 550 to 590° C., slightly higher than the softening point of the dielectric material, thereby producing second dielectric layer 82. As a result, dielectric layer 8 is formed.

The panel brightness remarkably increases and discharge voltage remarkably decreases with decrease in thickness of dielectric layer 8, so that it is preferable that the thickness is minimized within the range where the dielectric voltage does not decrease. On this condition and in view of visible light transmittance, the thicknesses of dielectric layer 8, first dielectric layer 81, and second dielectric layer 82 are set at 41 μm or less, 5 to 15 μm, and 20 to 36 μm, respectively, in the present embodiment.

When the content of bismuth oxide ($Bi_2O_3$) is 11 wt % or less in second dielectric layer 82, coloring hardly occurs, but air bubbles are apt to occur in second dielectric layer 82 disadvantageously. When the content exceeds 40 wt %, disadvantageously, coloring is apt to occur and the transmittance increase is difficult.

It is required that the content of bismuth oxide ($Bi_2O_3$) in first dielectric layer 81 differs from that in second dielectric layer 82. That is because the following phenomenon is recognized. When the content of bismuth oxide ($Bi_2O_3$) in first dielectric layer 81 is equal to that in second dielectric layer 82, air bubbles occurring in first dielectric layer 81 generate air bubbles also in second dielectric layer 82 in the firing step of second dielectric layer 82.

When the content of bismuth oxide ($Bi_2O_3$) in second dielectric layer 82 is smaller than that in first dielectric layer 81, second dielectric layer 82 occupies about 50% or greater of the total thickness of dielectric layer 8. Therefore, a yellowing phenomenon hardly occurs, the transmittance can be increased, and Bi-based material is expensive, so that the cost of employed raw material can be reduced.

When the content of bismuth oxide ($Bi_2O_3$) in second dielectric layer 81 is larger than that in the first dielectric layer, the softening point of second dielectric layer 81 can be decreased and hence the removal of the air bubbles in the firing step can be promoted.

In the PDP manufactured in this manner, even when silver (Ag) material is used in display electrodes 6, occurrence frequency of the yellowing phenomenon in which front glass substrate 3 colors is low, no air bubble occurs in dielectric layer 8, and dielectric layer 8 of high dielectric voltage performance can be attained.

Next, a reason of suppression of yellowing and air bubbling in first dielectric layer 81 that is made of these dielectric materials in the PDP of the embodiment of the present invention is described. When molybdenum oxide ($MoO_3$) or tungsten oxide ($WO_3$) is added to dielectric glass containing bismuth oxide ($Bi_2O_3$), compounds such as $Ag_2MoO_4$, $Ag_2Mo_2O_7$, $Ag_2Mo_4O_{13}$, $Ag_2WO_4$, $Ag_2W_2O_7$, and $Ag_2W_4O_{13}$ are easily produced at a low temperature of 580° C. or lower. In the embodiment of the present invention, the firing temperature of dielectric layer 8 is 550 to 590° C., so that silver ions ($Ag^+$) dispersing in dielectric layer 8 during firing react with molybdenum oxide ($MoO_3$), tungsten oxide ($WO_3$), cerium oxide ($CeO_2$), or manganese oxide ($MnO_2$) in dielectric layer 8 to produce stable compounds, and hence become stable. In other words, the silver ions ($Ag^+$) are not reduced but stabilized, so that the silver ions do not coagulate and do not produce colloid. The stabilization of silver ions ($Ag^+$) suppresses generation of oxygen accompanying colloid coagulation of the silver (Ag), so that occurrence of air bubbles in dielectric layer 8 is reduced.

For making use of these advantages, the content of molybdenum oxide ($MoO_3$), tungsten oxide ($WO_3$), cerium oxide ($CeO_2$), or manganese oxide ($MnO_2$) in dielectric glass containing bismuth oxide ($Bi_2O_3$) is preferably set at 0.1 wt % or more, more preferably between 0.1 and 7 wt % inclusive. Especially, yellowing is hardly suppressed at 0.1 wt % or less, and glass colors at 7 wt % or more, disadvantageously.

Since the first dielectric layer contains calcium oxide (CaO), the calcium oxide (CaO) serves as an oxidizer in the firing step of the first dielectric layer, and removal of the binder component remaining in the electrode is promoted. Since the second dielectric layer contains barium oxide (BaO), the transmittance thereof is increased advantageously.

In dielectric layer 8 of the PDP of the embodiment of the present invention, the yellowing and air bubbling are suppressed in first dielectric layer 81 that is in contact with metal bus electrodes 4b and 5b made of silver (Ag) material, and high light transmittance is achieved by second dielectric layer 82 disposed on first dielectric layer 81. As a result, the whole dielectric layer 8 can achieve a PDP where air bubbling and yellowing hardly occur and the transmittance is high.

Next, the composition and the sealing method of sealing material 50 of the PDP of the embodiment of the present invention are described in detail. The peripheral edge of one of back plate 10 and front plate 2 is coated with a paste-like sealing composition that contains the following components:
  glass containing at least bismuth oxide ($Bi_2O_3$), and molybdenum oxide ($MoO_3$) or tungsten oxide ($WO_3$);
  a heat-resistant filler; and
  an organic binder component.
After drying for a certain time, temporary firing is performed at about 400° C. to burn and remove the organic binder component. Back plate 10 and front plate 2 are faced to each other so that the display electrode 6 group of front plate 2 is orthogonal to address electrodes 12 of back plate 10, and are fired at 450 to 480° C. to solidify sealing material 50.

In the composition of the sealing material used here, preferably, the glass component has a glass softening point of 410° C. or higher, and contains at least 75 wt % or more bismuth oxide ($Bi_2O_3$) and 0.2 wt % or more molybdenum oxide ($MoO_3$) or tungsten oxide ($WO_3$). More preferably, the glass component contains the following elements:
  75 to 85 wt % bismuth oxide ($Bi_2O_3$);
  5.6 to 18 wt % zinc oxide (ZnO);
  2 to 9 wt % boron oxide ($B_2O_3$);
  0.2 to 1.1 wt % aluminum oxide ($Al_2O_3$);
  0.1 to 1 wt % at least one selected from calcium oxide (CaO), strontium oxide (Sr), and barium oxide (BaO); and
  0.2 to 5 wt % at least one selected from molybdenum oxide ($MoO_3$) and tungsten oxide ($WO_3$).
When the content of bismuth oxide ($Bi_2O_3$) is less than 75 wt %, the softening point of the glass hardly decreases to disable sealing. When the content of bismuth oxide ($Bi_2O_3$) is more than 85 wt %, the bismuth oxide violently reacts with silver (Ag) in display electrodes 6 and address electrodes 12, and hence air bubbling is apt to occur.

The heat-resistant filler is used for adjusting the thermal expansion coefficient of sealing material 50 and controlling the flow state of the glass. As the filler, cordierite, forsterite, β-eucryptite, zircon, mullite, barium titanate, aluminum titanate, titanium oxide, molybdenum oxide, tin oxide, aluminum oxide, or quartz glass is especially preferable.

The sealing material having such a glass component results in the following advantage. Since molybdenum oxide ($MoO_3$) or tungsten oxide ($WO_3$) is added, it reacts with silver ions ($Ag^+$) in display electrodes 6 and address electrodes 12 during firing sealing material 50 to produce stable compounds, similarly to the above-mentioned dielectric layer. As a result, the silver ions ($Ag^+$) are stabilized, so that generation of oxygen accompanying colloid coagulation of silver (Ag) is suppressed, generation of air bubbles in sealing material 50 is suppressed, and sealing having air-tightness is allowed. Especially in a high-definition PDP in a high-definition TV or the like where the number of scanning lines is two or more times that in the conventional art, the number of electrodes is increased and hence the advantage of the present invention becomes remarkable. Thus, a reliable PDP can be achieved.

In the present embodiment, exhaust pipe 51 and frit tablet 52 used for fixing exhaust pipe 51 to back glass substrate 11 or the like in FIG. 3 may have a composition similar to that of sealing material 50. When exhaust pipe 51 has the similar composition, the compositions of sealing material 50, exhaust pipe 51, and frit tablet 52 can become environmentally friendly compositions containing no lead (Pb).

Example

A PDP of the embodiment of the present invention is adapted as a discharge cell to a 42-inch class high-definition television (TV). The following PDPs are produced. The height of the barrier ribs is set at 0.15 mm, the interval (cell pitch) between the barrier ribs is set at 0.15 mm, and the distance between the display electrodes is set at 0.06 mm in each PDP. The compositions of sealing materials 50 of the PDPs are made different, Xe—Ne based mixed gas containing 15 vol % Xe is filled into the PDPs at a filling pressure of 60 kPa.

Table 1 shows samples of sealing material 50 having a different glass component. Table 2 shows combinations of the glass components of Table 1 and heat-resistant frits, and shows results of evaluating the air-tightness of the PDP.

TABLE 1

| Glass components of sealing materials | Sample No. of sealing materials | | | | | |
|---|---|---|---|---|---|---|
| | 1 | 2 | 3 | 4 | 5 | 6 |
| $Bi_2O_3$ | 75.0 | 80.0 | 85.0 | 82.0 | 50.0 | 95.0 |
| ZnO | 18.0 | 11.0 | 5.9 | 5.6 | 18.9 | — |
| $B_2O_3$ | 5.5 | 7.8 | 2.0 | 9.0 | 28.1 | 2.7 |
| $SiO_2$ | — | — | — | — | 2.0 | 2.3 |
| $Al_2O_3$ | 0.2 | 0.5 | 1.1 | 0.4 | 1.0 | — |
| CaO | — | 0.5 | — | — | — | — |
| SrO | — | — | 1.0 | 1.0 | — | — |
| BaO | 0.5 | — | — | — | — | — |
| $MoO_3$ | 0.8 | — | 5.0 | — | — | — |
| $WO_3$ | — | 0.2 | — | 0.2 | — | — |
| Softening points(° C.) | 430 | 420 | 400 | 426 | 571 | 372 |

TABLE 2

| Panel numbers | Sample No. of sealing materials | Glass components of sealing materials (wt %) | Type of heat-resistant fillers for sealing materials, and their used amounts (wt %) | Presence or absence of vacuum leakage during 100-hour discharge after sealing |
|---|---|---|---|---|
| 1 | No. 1 | 96 | β-eucrytite: 4 wt % | Absence |
| 2 | No. 1 | 96 | Forsterite: 4 wt % | Absence |
| 3 | No. 1 | 96 | Quartz glass: 4 wt % | Absence |
| 4 | No. 2 | 90 | Forsterite: 4 wt %, molybdenum oxide: 6 wt % | Absence |
| 5 | No. 2 | 90 | Mullite: 10 wt % | Absence |
| 6 | No. 2 | 90 | Barium titanate: 5 wt %, aluminum oxide: 5 wt % | Absence |
| 7 | No. 3 | 80 | Cordierite: 15 wt %, aluminum oxide: 5 wt % | Absence |
| 8 | No. 3 | 80 | Zircon: 10 wt %, titanium oxide: 5 wt %, quartz glass: 5 wt % | Absence |
| 9 | No. 3 | 80 | Barium titanate: 15 wt %, aluminum oxide: 5 wt % | Absence |
| 10 | No. 4 | 85 | Cordierite: 15 wt % | Absence |
| 11 | No. 4 | 85 | β-eucryptite: 10 wt %, zircon: 5 wt % | Absence |
| 12 | No. 4 | 85 | Forsterite: 9 wt %, mullite: 6 wt % | Absence |
| 13 | No. 1 | 95 | Cordierite: 5 wt % | Absence |
| 14 | No. 2 | 95 | Cordierite: 5 wt % | Absence |
| 15 | No. 3 | 95 | Cordierite: 5 wt % | Absence |
| 16 | No. 5 | 90 | Cordierite: 10 wt % | Presence |
| 17 | No. 6 | 90 | Cordierite: 5 wt %, mullite: 5 wt % | Presence |

The air-tightness is evaluated by performing continuous discharge for 100 hours after sealing the front plate and back plate with each sealing material and by determining whether there is leakage from discharge space. According to the result of Table 2, in sample No. 5 and sample No. 6 where the glass components of the sealing materials are out of the range of the present invention, vacuum leakage occurs regardless of the type and composition of each heat-resistant frit.

Thus, in the embodiment of the present invention, a reliable sealing material and an environmentally friendly PDP containing no lead (Pb) can be obtained.

INDUSTRIAL APPLICABILITY

The present invention provides a PDP that has high sealing reliability, is environmentally friendly, and has high display quality. This PDP is useful for a large-screen display device.

The invention claimed is:

1. A plasma display panel comprising:
   a front plate including a display electrode, a dielectric layer, and a protective layer on a glass substrate; and
   a back plate including an address electrode, a barrier rib, and a phosphor layer on a substrate, wherein:
   the front plate is faced to the back plate, and a periphery of the front plate and the back plate is sealed with a sealing material to form discharge space,
   the sealing material contains, as a glass component, bismuth oxide and at least one of molybdenum oxide and tungsten oxide,
   the sealing material contains no lead, and
   the sealing material contains at least one of $Ag_2WO_4$, $Ag_2W_4O_{13}$, $Ag_2MoO_4$, $Ag_2Mo_2O_7$, and $Ag_2MO_4O_{13}$,
   content of bismuth oxide in the glass component is between 75 and 85% inclusive, and
   glass softening point of the glass component including said content of bismuth oxide is 400° C. or higher.

2. The plasma display panel of claim 1, wherein the sealing material contains, as a heat-resistant filler, at least one of cordierite, forsterite, β-eucryptite, zircon, mullite, barium titanate, aluminum titanate, titanium oxide, molybdenum oxide, tin oxide, aluminum oxide, and quartz glass.

3. The plasma display panel of claim 1, wherein at least one of the display electrode and the address electrode is a metal electrode containing silver.

4. The plasma display panel of claim 1, wherein content of the molybdenum oxide or the tungsten oxide is 0.2 wt % or more.

5. The plasma display panel of claim 1, wherein content of the molybdenum oxide or the tungsten oxide is 0.2 wt % to 5 wt %.

* * * * *